Sept. 8, 1931. E. RICARD ET AL 1,822,455
PROCESS FOR THE SIMULTANEOUS DISTILLATION, PURIFYING, AND
DEHYDRATION OF ALCOHOL OBTAINED FROM FERMENTED MASH
Filed March 28, 1929
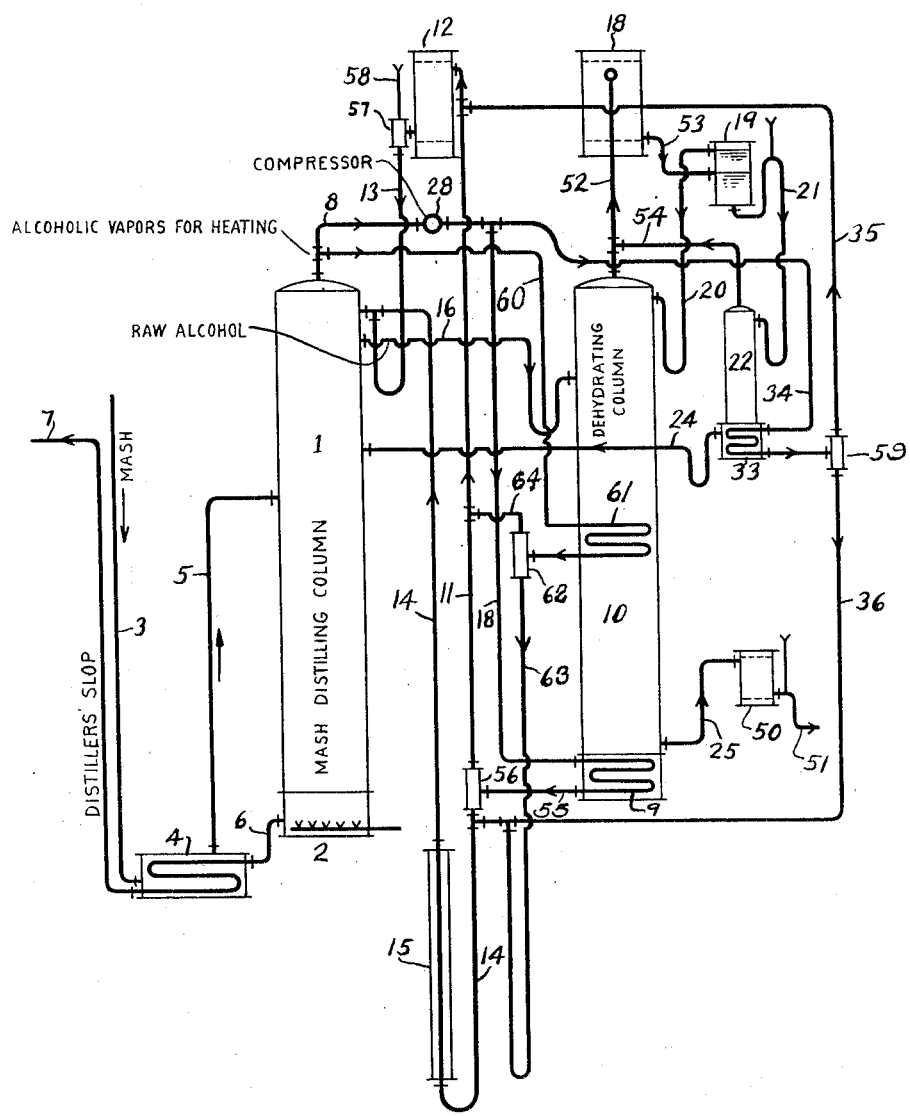
INVENTORS
Eloi Ricard, Paul Savarit and
Henri Martin Guinot
BY
ATTORNEY

Patented Sept. 8, 1931

1,822,455

UNITED STATES PATENT OFFICE

ELOI RICARD, PAUL SAVARIT AND HENRI MARTIN GUINOT, OF MELLE, FRANCE, ASSIGNORS TO U. S. INDUSTRIAL ALCOHOL CO., OF NEW YORK, N. Y., A CORPORATION OF WEST VIRGINIA

PROCESS FOR THE SIMULTANEOUS DISTILLATION, PURIFYING, AND DEHYDRATION OF ALCOHOL OBTAINED FROM FERMENTED MASH

Application filed March 28, 1929, Serial No. 350,809, and in France April 3, 1928.

In our prior application Serial No. 270,337, filed April 16, 1928, we have disclosed an improvement in the manufacture of absolute alcohol from fermented mashes containing aqueous alcohol, having for its object an important reduction in the amount of steam required for heating, in order to reduce the cost of manufacture of the alcohol. In that application the heat of the alcoholic vapors issuing from the column used for distilling the mashes at a very high degree was utilized for heating the dehydrating column, either partially or entirely.

This was accomplished by conducting the alcoholic vapors leaving the top of the distilling column to a coil in the dehydrating column, and causing condensation to take place in this coil, so that the contents of the dehydrating column were heated indirectly by the sensible and latent heat relinquished by the vapors. The resulting condensate was returned to the mash distilling column and the uncondensed vapors were likewise condensed and returned to that column.

The temperature of the vapors passing from the distilling column when operating at atmospheric pressure is such that they can be employed in this way to heat about three-quarters of the dehydrating column, but the basal portion of this column must be maintained at a higher temperature and consequently, in one form of execution of the invention of our earlier application, a steam coil was provided for heating the lower part of the dehydrating column.

We also disclosed, however, that the entire heating of the dehydrating column (leaving out of account the heat contained in the raw alcohol to be dehydrated) could be supplied by the alcoholic vapors in the manner described, by maintaining the distilling column under a pressure sufficient to raise the temperature of the alcoholic vapors to the requisite degree.

We have discovered that we can realize a modification of the process if instead of maintaining the distilling column under pressure we compress a part of the vapors passing therefrom sufficiently to raise their temperature preferably several degrees above 81° C. and that in this way we are able to utilize the calories contained in these alcoholic vapors for the total heating of the dehydrating column and such secondary columns as may be employed. All of the vapors need not necessarily be so compressed, since it would be sufficient to compress only the part of the vapors necessary for heating the lower part of the dehydrating column, and the heating of the secondary columns. In that case, the upper part of the dehydrating column would continue to be heated as in the first example given in the copending application above mentioned by the vapors from the distilling column not subjected to compression.

The accompanying drawing illustrates in diagram an apparatus for carrying out the present invention.

The distilling column 1 is heated by steam at 2. The fermented mash, for example a 7 per cent. (Gay Lussac) mash, to be distilled is supplied continuously through the pipe 3 and as in our former application becomes heated to 90° C. in a heat-exchange device 4, where it is heated by the distillers' wash which is discharged from the bottom of the distilling column at 6 and after being cooled in the heat-exchanger is conducted away through a pipe 7. The heated mash proceeds through a pipe 5 to the column 1.

Distillation in this column is conducted so as to produce high grade raw alcohol, preferably 90°–95.5° Gay Lussac, and this alcohol passes through the pipe 16 to the second distilling column 10, which is the dehydrating column. Here the alcohol is subjected to azeotropic distillation in the presence of a suitable water entrainer, such as benzol for example, with which this column is charged. The dehydrated or absolute alcohol is drawn off at the base of this column through a pipe 25 to a cooler 50 having a vented outlet pipe 51.

The vapors issuing from the top of the dehydrating column pass through the pipe 52 to a condenser 18, from which the condensate flows through a pipe 53 to a decanting apparatus 19, where it separates into two layers. The layer rich in entrainer is continually returned through a pipe 20 to the dehydrating column, while the liquid composing the other layer flows through a pipe 21 to a small column 22 where it is distilled to remove entraining liquid, the vapors of this liquid passing through a pipe 54 to the pipe 52 and thence to the condenser 18, to return thence to the dehydrating column 10. The liquid discharged from the bottom of the small apparatus 22 and which comprises alcohol and water is returned through a pipe 24 to the distilling column 10.

The alcoholic vapors issuing from the top of the column 1 are utilized for heating the dehydrating column 1 and also preferably the secondary or small column 22 in the manner previously referred to, and in accordance with the present invention these vapors, or a part thereof, are compressed after leaving the distilling column in order to raise their temperature materially. In this way the entire heating of the dehydrating column 10, or of both the dehydrating column and the secondary column 22 (leaving out of account the heat carried by the materials to be treated in these columns) can be effected by the vapors, without operating the distilling column 1 under pressure. However, the invention is not necessarily limited to the entire heating of the columns 10 and 22 in this way, or to operation of the distilling column 1 at atmospheric pressure.

The pipe 8 is connected with a compressor 28, and the compressed vapors are conducted through two pipes 18 and 34. The pipe 18 is connected with a surface heating and condensing coil 9 in the base of the column 10, whereby the contents of this column are heated by sensible and latent heat surrendered by the vapors.

The outlet 55 of this coil is connected with a separator 56 from which there extends a vapor pipe 11 and a liquid-conducting pipe 14. Uncondensed vapors rise through the pipe 11 to a condenser 12, from which the condensate passes to a separator 57 having a vent 58 to the atmosphere and is returned through a pipe 13 to the distilling column 1.

The liquid condensed in the coil 9 is elevated by any suitable pump or lift 15 in the pipe 14 and is also returned to the column 1, all of the alcoholic vapors used for heating the dehydrating column being condensed and returned to the distilling column where the mash is distilled in continuous operation. The vapors and their condensate are thus circulated in a closed cycle between said distilling column and the heating coil which heats the mixture undergoing azeotropic distillation in the column 10 to remove the water from the alcohol and obtain anhydrous alcohol.

The branch pipe 34 leading from the compressor is connected with a heating and condensing coil 33 in the base of the small column 22. The outlet of this coil is connected with a separator 59, from which the liquid resulting from condensation in the coil flows through a pipe 36 to the pipe 14 and is returned by the lift device 15 to the distilling column 1. Vapors which pass through the coil 33 without being condensed rise through a pipe 35 and thence to the condenser 12, from which the condensate is returned to the column. Thus, as in the case of the vapors used for the heating of column 10, all the vapors utilized for the heating of column 22 are circulated in a closed cycle, are condensed and returned to the column where the mash is being distilled.

The compressed vapors supplied to the coil 9 need not be required to supply all the heat required for heating the column 10. A branch 60 is preferably taken off from the vapor pipe 8 between the column 1 and the compressor 28, this pipe being connected with a heating and condensing coil 61 located in the dehydrating column intermediate its upper and lower ends. The uncompressed vapors yield up sensible and latent heat through the walls of this coil, the liquid resulting from condensation in the coil passes from a trap 62 by way of a pipe 63 to the pipe 14 and the lift 15, to be returned to the column 1, and the uncondensed vapors rise through a pipe 64 and pass to the condenser 12, to be condensed and returned to the column 1.

While we have described our invention in detail, we wish it to be understood that changes may be made in the manner of carrying it into effect without departing from the spirit and scope of the invention as defined in the claims. Additional apparatus and steps which may be employed for the purification of the alcohol have not been described since they are unnecessary to an understanding of the essential novelty of the present improvement.

What we claim is:—

1. In the manufacture of absolute alcohol from fermented mashes containing aqueous alcohol, wherein the mash is distilled in a distilling column and the alcohol thus obtained is conducted to a dehydrating column where it is dehydrated by the azeotropic method, and wherein alcoholic vapors issuing from said distilling column are conducted into the dehydrating column and are there caused to surrender sensible and latent heat in a manner to provide indirect surface heating in said column, the liquid resulting from the condensation of the vapors being returned to the distilling column, the step which comprises compressing such vapors after they leave the distilling column in order to increase their temperature and their heating effect in the dehydrating column.

2. In the manufacture of absolute alcohol from fermented mashes containing aqueous alcohol, wherein the mash is distilled in a distilling column and the alcohol thus obtained is conducted to a dehydrating column where it is dehydrated by the azeotropic method, and wherein alcoholic vapors issuing from said distilling column are conducted into the dehydrating column and are there caused to surrender sensible and latent heat in a manner to provide indirect surface heating in said column, the liquid resulting from the condensation of the vapors being returned to the distilling column, the steps which comprise compressing a portion of the vapors issuing from the distilling column in order to increase their temperature and the amount of heat which they supply in the manner stated at one region in the dehydrating column, while another portion of the vapors, without compression, is caused to supply heat in the manner stated at another region in the dehydrating column.

3. The process which comprises distilling at high degree in a distilling column fermented mash containing aqueous alcohol, conducting the raw alcohol thus obtained to another distilling column and there subjecting it to azeotropic distillation to dehydrate the alcohol, conducting off alcoholic vapors from the mash distilling column and thereupon compressing such vapors, utilizing the compressed vapors for surface heating in the dehydrating column in such manner as to recover latent heat from the vapors, and returning all of the vapors so utilized as condensate to the mash distilling column.

4. The process which comprises distilling at high degree in a distilling column fermented mash containing aqueous alcohol, conducting the raw alcohol thus obtained to another distilling column and there subjecting it to azeotropic distillation to dehydrate the alcohol, conducting off alcoholic vapors from the mash distilling column and thereupon compressing a part of such vapors, utilizing the compressed and uncompressed vapors for surface heating in different portions of the dehydrating column in such manner as to recover latent heat from the vapors, and returning all of the vapors so utilized as condensate to the mash distilling column.

5. The process which comprises distilling at high degree in a distilling column fermented mash containing aqueous alcohol, conducting the raw alcohol thus obtained to another distilling column and there subjecting it to azeotropic distillation to dehydrate the alcohol, discharging the dehydrated alcohol from this column, condensing the vapors issuing from the dehydrating column and causing this condensate to separate into layers, distilling the liquid of one of these layers in a secondary column, conducting off alcoholic vapors from the mash distilling column and thereupon compressing such vapors, utilizing these compressed vapors for surface heating in the dehydrating column and the secondary column in such manner as to recover latent heat from the vapors, and returning all of the vapors so utilized as condensate to the mash distilling column.

In testimony whereof we have signed this specification.

ELOI RICARD.
PAUL SAVARIT.
HENRI MARTIN GUINOT.